(12) United States Patent
Daly et al.

(10) Patent No.: US 9,769,636 B2
(45) Date of Patent: *Sep. 19, 2017

(54) USE OF THE COMMERCIAL MOBILE ALERT SYSTEM TO TRIGGER ALTERNATIVE RECEIVERS

(71) Applicant: AT&T Intellectual Property I, L.P., Atlanta, GA (US)

(72) Inventors: Brian Kevin Daly, Peachtree Corners, GA (US); DeWayne A. Sennett, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/835,924

(22) Filed: Aug. 26, 2015

(65) Prior Publication Data

US 2017/0064528 A1 Mar. 2, 2017
US 2017/0164174 A9 Jun. 8, 2017

Related U.S. Application Data

(63) Continuation of application No. 14/472,893, filed on Aug. 29, 2014, now Pat. No. 9,125,042, which is a
(Continued)

(51) Int. Cl.
| | |
|---|---|
| *H04W 4/22* | (2009.01) |
| *H04W 4/02* | (2009.01) |
| *H04M 11/04* | (2006.01) |
| *H04L 29/08* | (2006.01) |
| *H04W 4/06* | (2009.01) |
| *H04W 52/02* | (2009.01) |
| *H04W 4/00* | (2009.01) |

(52) U.S. Cl.
CPC ............. *H04W 4/22* (2013.01); *H04L 67/26* (2013.01); *H04W 4/02* (2013.01); *H04W 4/06* (2013.01); *H04W 52/0229* (2013.01); *H04W 4/001* (2013.01); *Y02B 60/50* (2013.01)

(58) Field of Classification Search
CPC ........ H04L 67/26; H04W 4/001; H04W 4/02; H04W 4/06; H04W 4/22
USPC ...................................................... 455/404.1
See application file for complete search history.

(56) References Cited

U.S. PATENT DOCUMENTS

| | | |
|---|---|---|
| 7,194,249 B2 | 3/2007 | Phillips et al. |
| 8,583,078 B2 | 11/2013 | Sweeney et al. |

(Continued)

OTHER PUBLICATIONS

Huey, Erik C., "PBS Station Using High-Tech to Help First Responders", Apr. 26, 2004, Reviewjournal.com, Las Vegas Review—Journal, http://reviewjournal.printthis.clickability.com/pUc[t?expire=&title=revie- wjournal.com.
(Continued)

*Primary Examiner* — Nathan Taylor
(74) *Attorney, Agent, or Firm* — Baker & Hostetler LLP

(57) ABSTRACT

A system and method for providing a message to a user of a device, such as a mobile cellular phone, which includes using a signal, such as a wireless broadcast alert, to turn on one or more receivers of the device configured to receive the message, conserves battery power for the device until it is needed in order to receive and transmit the message.

20 Claims, 8 Drawing Sheets

Related U.S. Application Data continuation of application No. 13/454,466, filed on Apr. 24, 2012, now Pat. No. 8,843,103.

(56) References Cited

U.S. PATENT DOCUMENTS

| | | | |
|---|---|---|---|
| 8,843,103 B2 | 9/2014 | Daly et al. | |
| 2009/0291670 A1* | 11/2009 | Sennett | H04M 3/53375 455/412.2 |
| 2010/0105351 A1* | 4/2010 | Xu | H04W 68/00 455/404.1 |
| 2011/0037590 A1* | 2/2011 | Kannan | G08B 27/005 340/539.13 |
| 2011/0081884 A1* | 4/2011 | Sennett | H04W 4/02 455/404.2 |
| 2011/0171923 A1* | 7/2011 | Daly | H04L 12/12 455/404.1 |
| 2013/0109340 A1* | 5/2013 | Williams | H04W 4/12 455/404.1 |
| 2013/0281045 A1* | 10/2013 | Daly | H04W 4/02 455/404.1 |

OTHER PUBLICATIONS

Jason, "PBS' Landmark Next-Generation Emergency Alert System Pilot Project to Use Mobile Digital TV", FierceMOBILECONTENT, Apr. 12, 2011, p. 1-2, http://www.fiercemobilecontent.com/print/node/ 16950.

Markets Financial Content, "PBS' Landmark Next-Generation Emergency Alert System Pilot Project to Use Mobile Digital TV", by: PBS via Business Wire News Releases, Apr. 12, 2011, pp. 1-3.

PBS to launch Emergency Alert System Pilot Project via Mobile Digital TV, Apr. 12, 2011, p. 1, htt.about.r//www.rnobilemarketingwatch.comiQbs-to-launch-emergencJ.about.-:-alert-system-Qilotproject.

TVTechnoogy, "Vegas PBS Prepares for Emergencies", Nov. 21, 2007, pp. 1-2, http://www.tvtechnology .com/printarticle.aspx?articleid= 18721 0.

* cited by examiner

USE OF THE COMMERCIAL MOBILE ALERT SYSTEM TO TRIGGER ALTERNATIVE RECEIVERS

CROSS REFERENCE TO RELATED APPLICATIONS

This application is a continuation of, and claims priority to, U.S. patent application Ser. No. 14/472,893, filed Aug. 29, 2014 which is a continuation of U.S. patent application Ser. No. 13/454,466, filed Apr. 24, 2012 which issued Sep. 23, 2014 as U.S. Pat. No. 8,843,103. U.S. patent application Ser. No. 14/472,893 is incorporated by reference herein in its entirety. U.S. Pat. No. 8,843,103 is incorporated by reference herein in its entirety.

TECHNICAL FIELD

The technical field generally relates to telematics using wireless communications and more specifically is directed to telematics embedded in mobile devices to provide value added services to subscribers.

BACKGROUND

The Commercial Mobile Alert System (CMAS) was established by the Federal Communications Commission (FCC) to allow wireless service providers to send emergency alerts to their subscribers. Such alerts are initially intended to be in the form of text messages, but may also take the form of audio and video alerts. The CMAS network will allow emergency services agencies, such as the Federal Emergency Management Agency (FEMA), to accept and aggregate alerts from federal, state, and local emergency operations centers, and send the alerts over a secure interface to wireless providers. The wireless providers can then distribute the alerts to their customers.

Emergency alerts issued by emergency services agencies may be intended to reach users in a specific geographical area. For instance, in the event of an impending potential natural disaster such as a hurricane, an emergency service agency may wish to notify the populations of the counties that have been determined to be most likely to be impacted by the potential disaster.

Emergency alert message may be provided to various types of devices in conformance with various types of formats. Thus, because multiple formats may be used, it is possible that a device, such as a mobile device, may not be able to process an emergency alert message because the emergency alert message was provided in a format not compatible with the device.

SUMMARY

The following presents a simplified summary that describes some aspects and/or embodiments of the subject disclosure. This summary is not an extensive overview of the disclosure. Indeed, additional or alternative aspects and/or embodiments of the subject disclosure may be available beyond those described in the summary.

As described herein, there is provided a method of alerting a user, such as a user of a cellular phone, to a broadcast, such as an emergency alert, comprising downloading configuration data to a device, such as a cellphone, which may be configured to receive the configuration data, which configuration data may correspond to a first source of transmitted information that may be transmitted in a geographical area associated with the location of the device. The configuration data may comprise an application on a mobile device that gets configuration data from the network or "cloud" in real-time, or the configuration data may be pre-provisioned on the mobile device and used by the executable application on the mobile device, or the configuration may be broadcast by the network on other communications channels which are read and processed by the application on the mobile device. The method may further comprise receiving through the device a signal, such as a "bell-ringer" signal from a second source of transmitted information, such as CMAS. A receiver in the device may then be instructed, in response to the bell-ringer signal, to power on and the device may be further instructed to tune to a channel or frequency associated with the geographic area for the device, and the channel or frequency may correspond to the first source of transmitted information. The transmitted information from the first source of information may then be transmitted to the user through the device.

In accordance with another example of the present disclosure, the first source of transmitted information may be one or more of DTV, FM, AM, satellite, and/or NWR broadcasts, and the receiver(s) may be configured to receive one or more of such broadcasts. The configuration data may be downloaded the first time the device is powered on in a new geographic location, and the device may include a wireless broadcast application (e.g., CMAS application) that accesses a website and downloads configuration data corresponding to the first source of transmitted information, including one or more of PBS stations, FM stations, AM stations, and NWR channels in use in the geographic location in which the device is located. The wireless broadcast application may default to one of the first sources of transmitted information known by the wireless broadcast application to transmit emergency broadcasts in the specified geographical area. The device may be further configured to determine relative signal strength of the various sources of transmitted information in the relevant geographical location, and may tune the device to the channel corresponding to the strongest relative signal strength.

In accordance with another example embodiment of the invention, a mobile device may be provided and configured to process a wireless broadcast message. The mobile device may further be configured to receive a wireless broadcast message through a wireless broadcast application, employ the wireless broadcast application to download configuration data corresponding to one or more broadcast sources for a geographic location when the mobile device is powered on for the first time in that geographic location, or when the device migrates for the first time into that geographic location while powered on. The device may be further configured to receive a wireless broadcast alert and display the alert to a user of the mobile device, and to determine through the wireless broadcast application that the mobile device is also capable of receiving signals from the broadcast source(s). The device may be further configured to use the wireless broadcast application to power on one or more receivers that are configured to receive broadcasts in the geographic location where the device is situated. The device may be further configured to receive signals from the broadcast sources and to tune to a channel determined by the wireless broadcast application to be associated with the geographic location of the mobile device. The device may be further configured to transmit information from the at least one broadcast source through the mobile device.

In accordance with another example embodiment of the present disclosure, a system for triggering alternative receivers of broadcast emergency alert information is provided, and may include at least one receiver configured to receive the emergency alert information from a first source of information. The receiver may initially be in an "off" state. The system may further include a processor configured to download configuration data for the first source of information corresponding to a geographic location in which the system is operating. The system may be further configured to receive a wireless broadcast alert from a second source of information, and to use the wireless broadcast alert to initiate an instruction to power the receiver from the "off" state to an "on" state, and to tune the receiver to a channel associated with the geographical location of the system. The system may be further configured to display the emergency alert information.

BRIEF DESCRIPTION OF THE DRAWINGS

The following description is better understood when read in conjunction with the appended drawings.

DESCRIPTION OF ILLUSTRATIVE EMBODIMENTS

Figure 1:
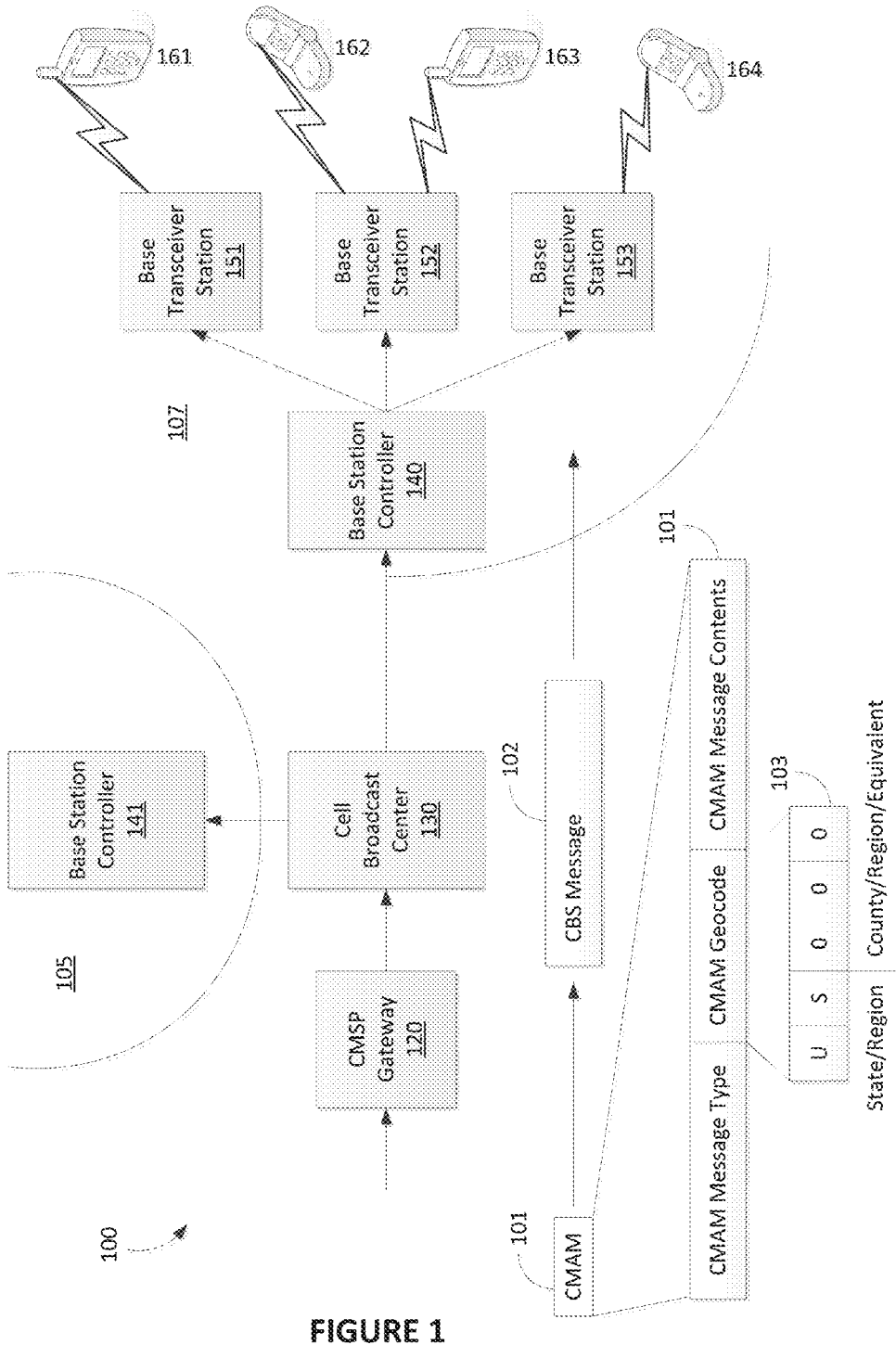
FIG. 1 is a block diagram of a non-limiting, exemplary system architecture in which systems and methods for identifying a geographical area in a commercial mobile alert service message may be implemented.

The present disclosure relates to conveying information through any medium that can be perceived by a user of a device, including by way of example, but not limitation, text data, voice data, video images, printed messages, audio transmissions, graphical images, and maps. The present disclosure also relates to broadcasting information, for example, the transmission of data (information packets) so that it can be received by a large number of receiving devices simultaneously. Examples of broadcast messages are mobile television service broadcast signals, including content broadcasts (content flow) and overhead information broadcasts (overhead flow) such as metadata messages.

The present disclosure further relates to the broadcast of emergency alerts. There are currently three types of emergency alerts. Presidential Alerts relate to national emergencies, Imminent Threat Alerts relate to emergencies where life or property is at risk, such as hurricanes or tornadoes, and Child Abduction Emergency/AMBER Alerts relate to missing or endangered children due to an abduction or runaway situation. Subscribers may be able to opt-out of receiving Imminent Threat and Child Abduction/AMBER alerts, but may not be permitted to opt-out of Presidential Alerts.

At the April 2011 National Association of Broadcasters show in Las Vegas, the Public Broadcasting System (PBS) announced it plans to test a next-generation emergency alert system. The system intends to feed Emergency Alert Service (EAS) information to platforms of all types, from cellphones, tablet computers, laptops, netbooks to in-car navigation systems, using the ATSC M/H Mobile DTV standard. This method requires the mobile device to have a DTV receiver compliant to the ATSC M/H Mobile DTV standard. The DTV signals could be broadcast on standard TV broadcast frequencies, dedicated mobile TV frequencies, or frequencies within the cell bands.

Other proposals have been for mobile devices to include FM or AM radios in the devices and use the "data channels" embedded in the FM or AM broadcast signals to send emergency alert information to FM/AM-capable devices.

A third proposal has NOAA Weather Radios (NWR) built into mobile devices to be used for obtaining additional emergency alert information.

Finally, mobile devices embedded in automobiles may have satellite radio receivers that may also be broadcasting emergency alert information on a dedicated channel or through a data feed.

These methods are independent of the CMAS, which is being developed to deliver emergency alerts to mobile devices.

There are several problems associated with using embedded DTV, FM, AM, satellite, or NWR in a mobile device such as a cellphone for receiving and broadcasting emergency alert services. In any given area of the country, there are typically many broadcast television or FM/AM radio stations on assigned channels, and a NWR broadcast on one of the assigned NWR channels (frequencies). A satellite broadcast channel may be common across the country due to the wide broadcast area. However, in order to be most effective, a DTV, FM, AM, satellite, or NWR receiver embedded in a mobile device would have to be "on" continuously, monitoring for an incoming emergency alert message on the correct "channel"—either by the user tuning the DTV, FM, AM, satellite, or NWR receiver to the correct channel in their area (for example, to the PBS station or to the FM station that would broadcast emergency alerts, or to the local NWR broadcast), or through a scanning function of the DTV, FM, AM, satellite, or NWR receiver. Either method is problematic, as it requires the receivers to be powered on continuously, thus significantly impacting the battery life of the device. The user may also be required to tune or scan for the correct channel, potentially costing valuable time in an emergency situation. Some mobile devices are configured to activate their receiver circuitry periodically, only a small percentage of the time, in order to conserve battery power. A problem with such devices, however, is that the receiver circuitry may be powered off at a critical moment when important information relating to an emergency situation has occurred.

In one embodiment, CMAS emergency alerts may be provided using Universal Mobile Telecommunications System (UMTS) and/or Global System for Mobile communications (GSM) cell broadcast technologies. This disclosure provides methods and systems for using an alert, such as a CMAS emergency alert, to power on one or more receivers in a device, such as DTV, FM, AM, satellite, and/or NWR receivers, which receivers can then be tuned to receive an emergency broadcast in the geographical area in which the device is located.

FIG. 1 illustrates an exemplary architecture 100 that may be used to provide emergency alerts to mobile devices using GSM, UMTS, or other wireless network technologies. An alert generated by a governmental or emergency services agency may be referred to as a Commercial Mobile Alert Message (CMAM). CMAM 101 may be generated at or otherwise provided to a wireless carrier or wireless service provider, referred to herein as a Commercial Mobile Service Provider (CMSP), by Alert Gateway 110, which may be a CMAS alert gateway, and may be operated by a governmental or emergency services agency. Alert Gateway 110 may transmit CMAM 101 to CMSP Gateway 120. CMSP Gateway 120 may be dedicated to receiving CMAMs from one or more alert gateways such as Alert Gateway 110, and may communicate with Alert Gateway 110 using a secure data connection. All other configurations of alert gateways and CMSP gateways, and all other means of communication between such gateways, including wired, wireless, secure, unsecure, encrypted, and unencrypted, are contemplated as within the scope of the present disclosure.

In one embodiment, CMAM 101 may be generated and/or transmitted from Alert Gateway 110 to CMSP Gateway 120, and may be limited to 90 characters and may be based on Common Alert Protocol (CAP) key fields. In one embodiment, CMAM 101 may include a message type, for example indicating that CMAM 101 is one of a "CMAS-Presidential", "CMAS-Extreme-Alert-Message", "CMAS-Severe-Alert-Message", or "CMAS-Amber-Alert" type message. Other message types are also contemplated. CMAM 101 may also include message contents that are intended for display to users receiving the message.

In one embodiment, CMAM 101 may include geocode 103, which may be generated by Alert Gateway 110 or any other device within or communicatively connected to the CMAS. Geocode 103 may be generated automatically, based on user input, or a combination of both. Geocode 103 may be referred to as a "CMAC_cmas_geocode". Geocode 103 may be five characters in length. Such characters may be letters or numbers, or a combination of both. Such characters may be represented in ASCII codes, binary representations, or any other form or representation that allows such a code to be identified and read by computing devices. The first two characters or digits of geocode 103 may identify the state or region of a geographical area. The last three characters or digits of geocode 103 may identify a specific county, region, or equivalent entities within the state or region identified by the first two characters or digits. Other quantities of characters or digits used to represent a geographical area, and other combinations of state, region, and geographical area identifiers are contemplated as within the scope of the present disclosure.

In one embodiment, the first two digits or characters of geocode 103 may contain an indication for a state that follows the two digit FIPS State Numeric Code as defined in Federal Information Processing Standard 5-2 (FIPS 5-2), titled "Codes for the Identification of the States, the District of Columbia and the Outlying Areas of the United States, and Associated Areas", dated 28 May 1987. In such an embodiment, if the last three characters or digits of geocode 103 are three zeroes (000), such a geocode may indicate that the entire state as specified by the first two digits or characters is the area of concern for the alert.

In one embodiment, where the last three characters or digits of geocode 103 are not three zeroes, the last three characters or digits of geocode 103 may contain an indication for a specific county as defined in Federal Information Processing Standard 6-4 (FIPS 6-4), titled "Counties and Equivalent Entities of the United States, Its Possessions, and Associated Areas", dated 31 Aug. 1990.

In one embodiment, an alert message intended for the entire United States including all states, the District of Columbia, possessions, and associated areas will be identified by the first two digits or characters of geocode 103 being set to "US" and the last three characters or digits of geocode 103 being set to "000", resulting in geocode 103 containing the code "US000".

In one embodiment, alerts may be targeted for regions of the country (such as the Gulf States). In such an embodiment, geocode values for regional areas such as FEMA regions or National Weather Service (NWS) regions may be used to construct a geocode such as geocode 103. FEMA regions may be assigned values in the format of "US0xx", while and the NWS regions may be assigned values in the format of "US1xx".

Figure 2:
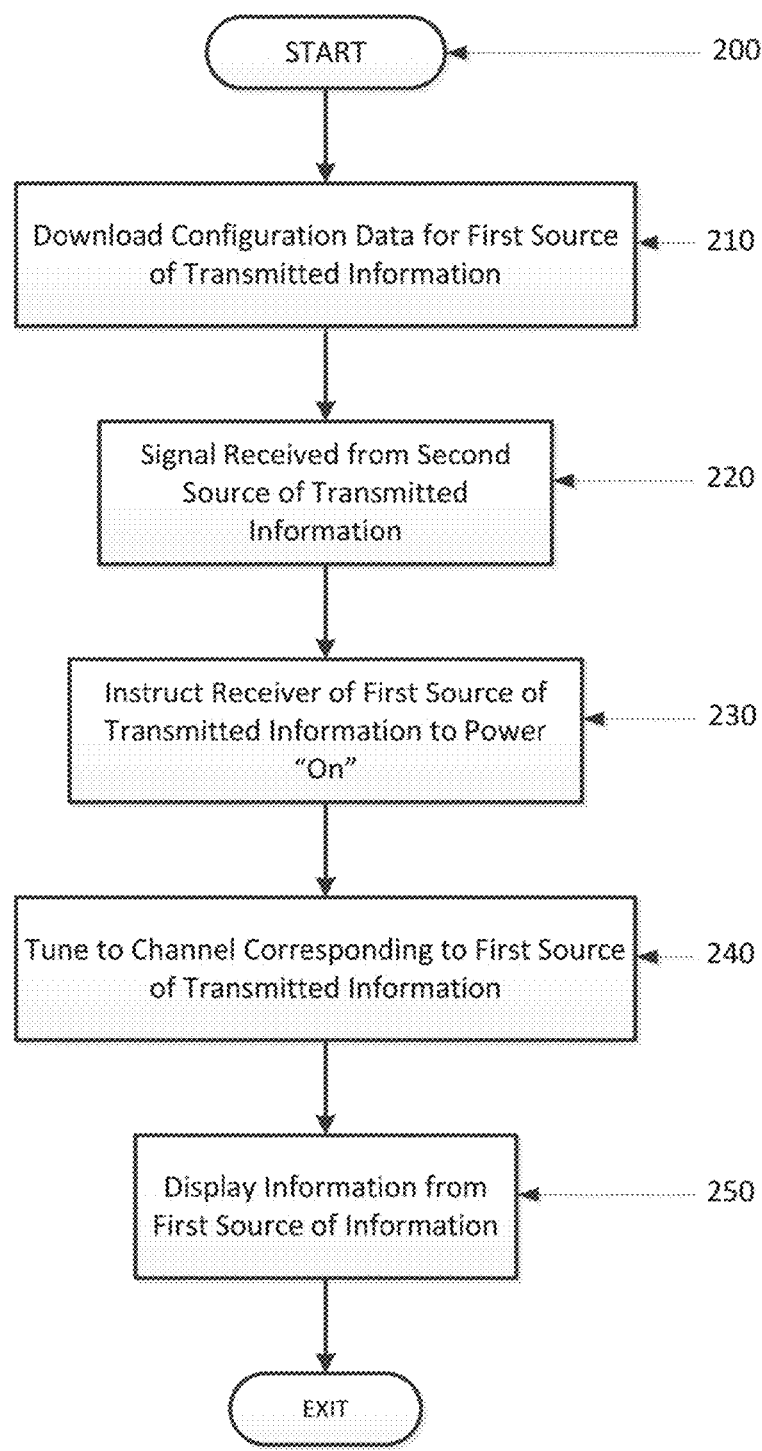
FIG. 2 is a flow chart of a non-limiting, exemplary method of processing a message according to an embodiment of the present disclosure.

FIG. 2 illustrates a non-limiting exemplary method 200 of providing an alert, such as an emergency alert message to one or more user devices. A wide variety of alerts may be issued, including without limitation earthquake warnings, tsunami warnings, severe weather alerts, wildfire alerts, Amber alerts, flash flood alerts, evacuation alerts, terror event warnings, pollution alerts, and general public advisories, all of which may be received and displayed in various embodiments of the present disclosure. At block 210, configuration data may be downloaded to a user device configured to receive such data, which may correspond to a first source of transmitted information that is transmitted in a geographical area associated with the location of the device. The user device may be a mobile device including, without limitation, mobile media broadcast receivers, cellular telephones, multimedia Internet enabled cellular telephones, (e.g., the Blackberry Storm®), tablet computers, laptops, netbooks, in-car navigation systems, personal data assistants, palm-top computers, wireless electronic mail receivers, Global Positioning System (GPS) receivers, wireless gaming controllers, portable media players, smart phones, Session Initiation Protocol phones, video phones, thin clients, TVs, DVD players, set top boxes, monitors, displays, receivers within motor vehicles, motor vehicle controls, and similar personal electronic devices which include a programmable processor and memory.

The downloading of configuration data at block 210 may occur the first time the user device is powered on in a new location, or may occur as the device migrates from one geographic location to another. Powering on the user device in order to download configuration data may be done manually by the user, or may be initiated through systems that can send an EAS alert to a device that is in "sleep" or "inactive" mode, such as disclosed in U.S. Application Publication Number US 2010/0105351 A1, incorporated in its entirety by reference herein.

This downloading of configuration data may involve the device using a CMAS application to access a website and download configuration data corresponding to the first source of transmitted information. The first source of transmitted information may include one or more of PBS stations, FM stations, AM stations, satellite broadcasts, and NWR channels in use for broadcasting emergency information in the geographic location in which the device is located. The user device may include one or more first receivers configured to receive transmitted information from one or more of these first sources of transmitted information. Such first receivers may be in the "on" or "off" position at the start. According to one method of practicing the present disclosure, such first receivers are in the "off" position at the start in order to conserve battery power.

At block 220, a signal may be received from a second source of transmitted information, such as a CMAS alert, which may be received by a second receiver. This signal may be received by a user device, such as a portable cellphone, using known methods, such as those disclosed in co-owned pending application Publication Number US 2011/0081884 A1, incorporated in its entirety by reference herein. Other sources of the second source of transmitted information for providing the signal at block 220 may include alert signals from the National Weather Service, Primary Notification (Japan), and Communications from Authority to Individuals and the Public During Emergencies (Europe), and other similar alerts, as will now be appreciated by those of ordinary skill in the art.

At block 230, one or more first receivers associated with the user device may be instructed to power "on" in response to receipt of the signal at block 220, which may be a "bell ringer" signal. In this way, such first receivers need not be maintained in the "on" position all the time, needlessly draining the battery of the user device, rather, such receivers may be powered "on" only when instructed to do so in response to receiving an alert, such as an emergency CMAS alert, on a different receiver that either does not use as much power, or is only on intermittently checking for emergency alerts.

At block 240, after the first receiver(s) is turned "on," it may be instructed to tune to a channel corresponding with the first source of information. The user may select, either in advance, or at block 240, which channel to tune to. Alternatively, the device may default to a channel to receive information from one of several possible first sources of transmitted information. In one embodiment of the present disclosure, the device may default to a channel by determining relative signal strength of the various first sources of transmitted information in the relevant geographic location in which the user device is located, and may tune the receiver to a channel corresponding to the greatest relative signal strength.

At block 250, once the selected first receiver is tuned to a channel to receive information from the first source of transmitted information, that information may be transmitted or displayed, such as through a speaker, vibrator, screen, printer, or other medium, to a user of the mobile device, who can then listen to, visualize or otherwise receive the transmitted information and make a determination based on it, such as rerouting, seeking shelter, etc. The user may then determine to exit the system, for example, powering "off" the first receiver(s) to conserve batter power in the user device.

In another embodiment of the present disclosure, a mobile device configured as described herein may be connected to an automobile navigation system, (for example, via Bluetooth® technology), that permits the mobile device to utilize speakers and/or screens in the automobile to display the information being broadcast as described herein. In this embodiment, the mobile device may be configured to alert the driver to a CMAS message, and tune the automobile's radio to the appropriate station to receive the broadcast message. In the case of weather alerts, the mobile device may be configured to display radar weather imaging on the automobile's navigation screen.

Figure 3:
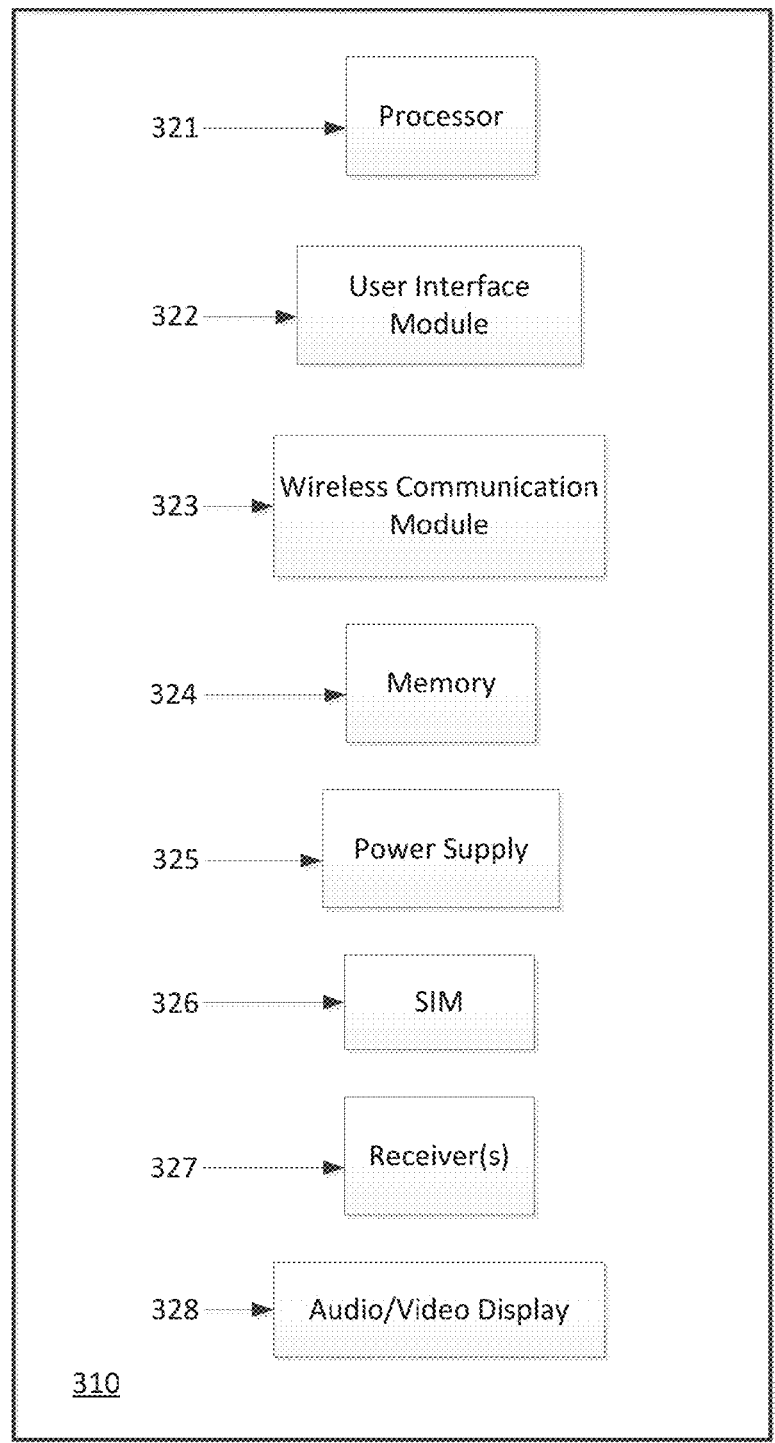
FIG. 3 is a block diagram of a non-limiting, exemplary device that may be used in connection with an embodiment of the present disclosure.

FIG. 3 schematically illustrates an example user device, such as a wireless device 310 that may be used in connection with an embodiment of the present disclosure. References will also be made to other Figures of the present disclosure as appropriate. For example, wireless devices described subsequently may each be a wireless device of the type described in regard to FIG. 3, and may have some, all, or none of the components and modules described in regard to FIG. 3. It will be appreciated that the components and modules of wireless device 310 illustrated in FIG. 3 are illustrative, and that any number and type of components and/or modules may be present in wireless device 310. In addition, the functions performed by any or all of the components and modules illustrated in FIG. 3 may be performed by any number of physical components. Thus, it is possible that in some embodiments the functionality of more than one component and/or module illustrated in FIG. 3 may be performed by any number or types of hardware and/or software.

Processor 321 may be any type of circuitry that performs operations on behalf of wireless device 310. In one embodiment, processor 321 executes software (i.e., computer readable instructions stored on a computer readable medium) that may include functionality related to transmitting and receiving telephonic communications including CBS messages and/or CMAMs in some form, communicating with, operating, or interfacing with a CMSP network, and/or running software configured to operate, communicate, or interface with a CMSP network, for example. Processor 321 in one embodiment may include a CMAS application enabling the mobile device 310 to access a website and download configuration data corresponding to one or more first sources of transmitted information described herein.

User interface module 322 may be any type or combination of hardware and/or software that enables a user to operate and interact with wireless device 310, and, in one embodiment, to interact with a system or software enabling the user to view, modify, or delete a CBS message such as those containing CMAM data as described herein. For example, user interface module 322 may include a display, physical and/or "soft" keys, voice recognition software, microphone, speaker and the like.

Wireless communication module 323 may be any type or combination of hardware and/or software that enables wireless device 310 to communicate with CMSP network equipment, for example, Base Transceiver Stations, or any other type of wireless communications network or network equipment.

Memory 324 may enable wireless device 310 to store information, such as a CBS message or the like, or the downloaded configuration data described herein. Memory 324 may take any form, such as internal random access memory (RAM), an SD card, a microSD card and the like.

Power supply 325 may be a battery or other type of power input (e.g., a charging cable that is connected to an electrical outlet, etc.) that is capable of powering wireless device 310.

SIM 326 may be any type of Subscriber Identity Module and may be configured on a removable or non-removable SIM card that allows wireless device 310 to store data on SIM 326.

Receiver(s) 327 may be one or more receivers associated with the wireless device 310 that are configured to receive transmitted information from one or more first sources of transmitted information, including by way of example, PBS stations, FM stations, AM stations, satellite, and/or NWR channels, and/or from a second source of information, such as a CMAS alert.

Audio/Video display 328 may be one or more speakers, screens, printers, or other media configured to provide a user of the mobile device with information being transmitted from the first source of transmitted information.

Figure 4:
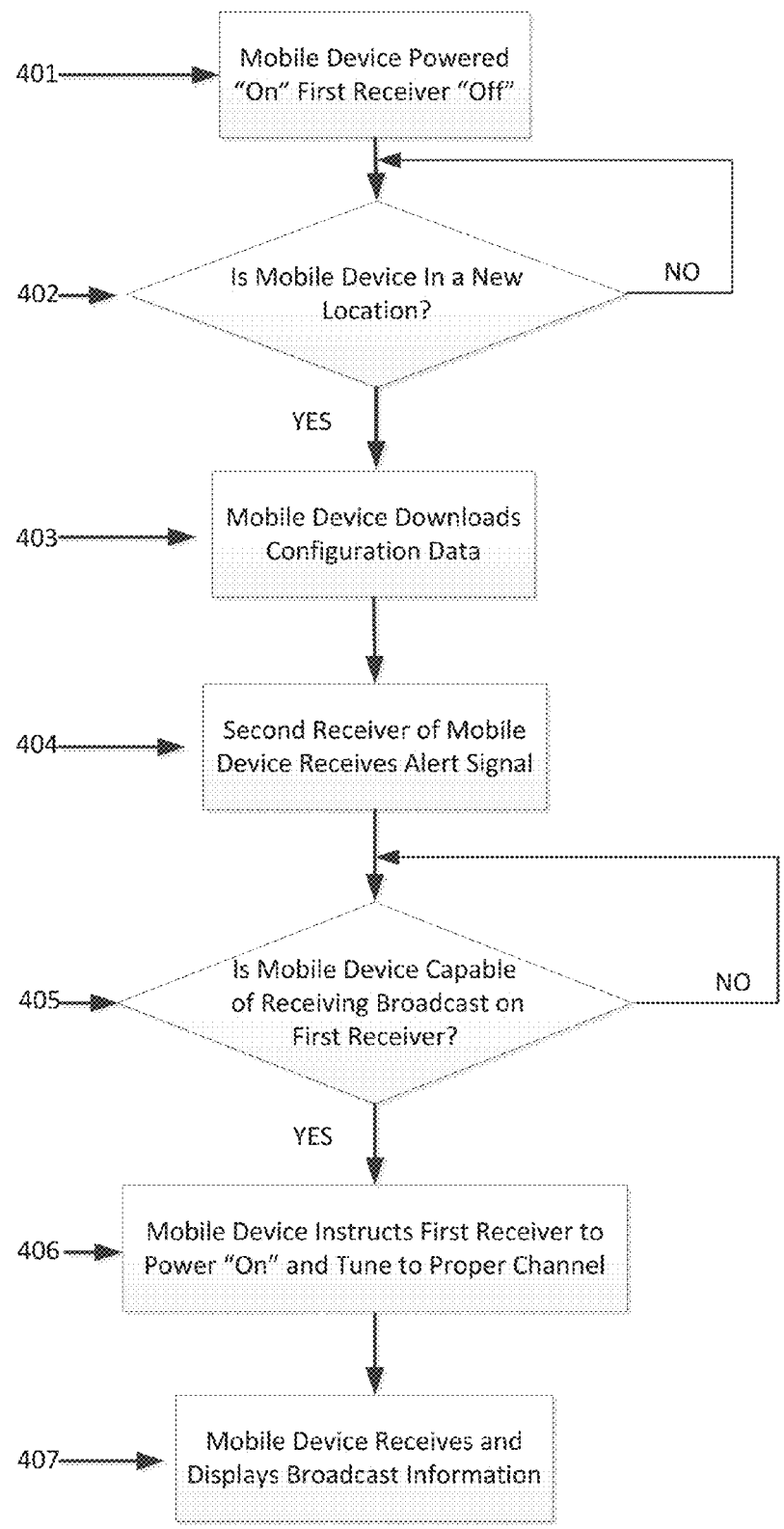
FIG. 4 is a flow chart of a non-limiting system and method of practicing an embodiment of the present disclosure.

Referring now to FIG. 4, there is illustrated a flow chart for practicing a method and system of an embodiment of the present disclosure. As illustrated at block 401, a mobile device may initially be powered "on," while a first receiver in the device is initially "off." A second receiver capable of receiving an alert message, such as a CMAS alert, may at this step also be powered "on."

When the mobile device is powered on, as illustrated at block 402, an application associated with the device may determine whether or not the device is in a new geographic location. If a negative response is received, the device may continue to periodically or continuously monitor the device to make geographic location determinations. If an affirmative response is received that the device has entered a new geographic location, the mobile device may download configuration data associated with that new geographic location at block 403 as previously discussed. As used herein, the term "new geographic location" is intended to mean a geographic location in which the device is resident the first time the mobile device is powered on, as well as a change in geographic location for the mobile device which could result in previously downloaded configuration data no longer being applicable to the new location in which the device is resident. Thus, a new geographic location may be determined by the device either when a new device is powered on for the first time, the first time the device is powered on in a new location, or while the device is on and migrates to a new location.

At block 404, the mobile device may receive an alert signal, such as a CMAS alert received through the second receiver, and may determine through an application at block 405 whether or not the device is capable of receiving a broadcast message in the relevant geographic location through the first receiver. If an affirmative determination is made, the mobile device may instruct the first receiver(s) to power "on," as illustrated at block 406. The mobile device may then receive and transmit/display the broadcast information, as illustrated at block 407. If a negative determination is made at block 405, the application in the device may continue to seek to determine if the first receiver(s) is capable of receiving a broadcast, or may seek alternative receivers associated with the device and seek to determine if such alternative receivers are capable of receiving a broadcast in the relevant geographic location.

Once the first receiver is powered "on," the mobile device may also tune the first receiver to an appropriate channel that is configured to receive the broadcast message in the relevant geographic location, which channel may have been determined in the download of configuration data at step 403.

Figure 5:
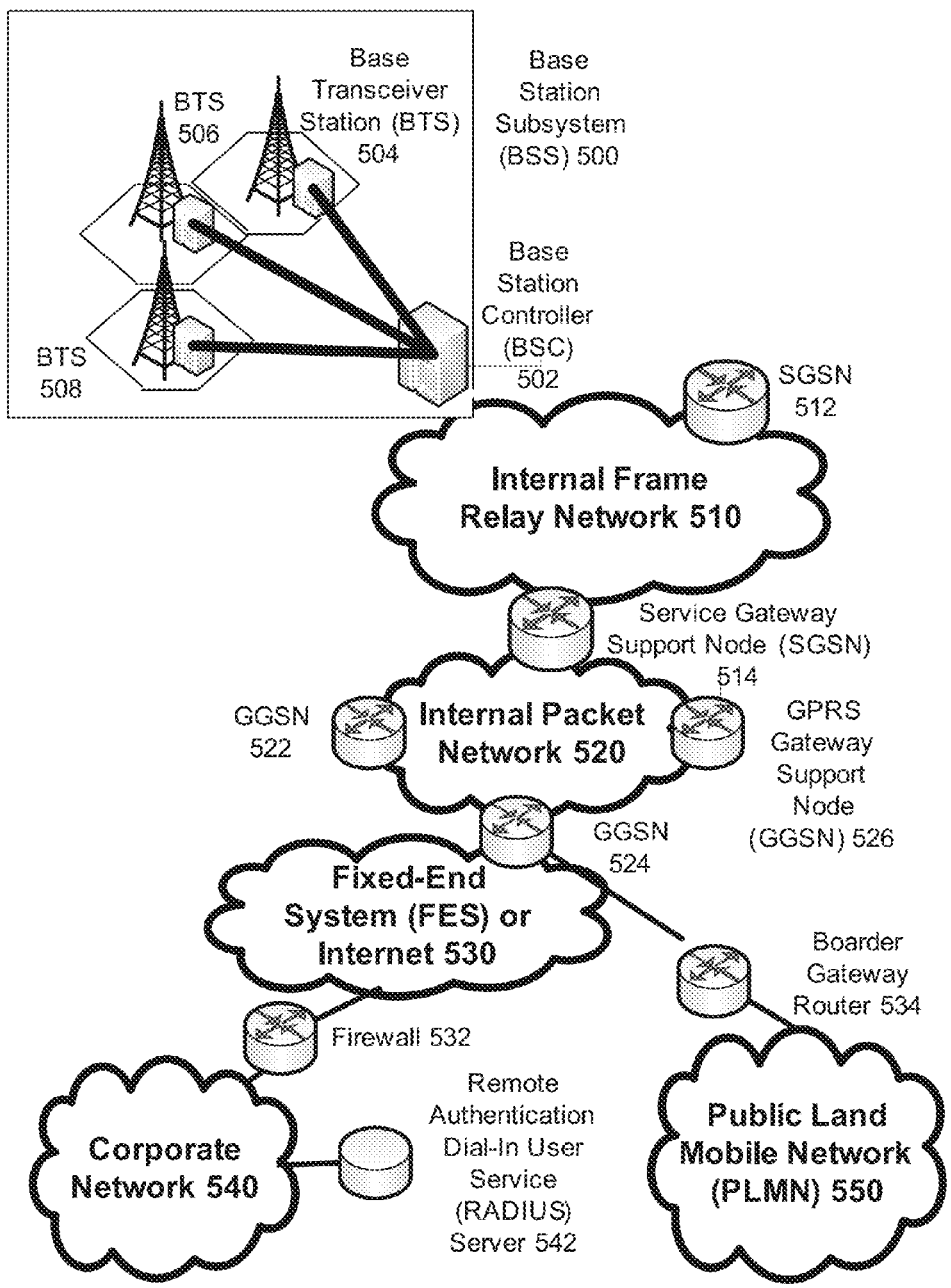
FIG. 5 depicts an overall block diagram of an exemplary packet-based mobile cellular network environment, such as a GPRS network, in which the CMAS may be utilized to trigger alternative receivers.

FIG. 5 depicts an overall block diagram of an exemplary packet-based mobile cellular network environment, such as a GPRS network, in which the CMAS may be utilized to trigger alternative receivers. In the exemplary packet-based mobile cellular network environment shown in FIG. 5, there are a plurality of Base Station Subsystems ("BSS") 500 (only one is shown), each of which comprises a Base Station Controller ("BSC") 502 serving a plurality of Base Transceiver Stations ("BTS") such as BTSs 504, 506, and 508. BTSs 504, 506, 508, etc. are the access points where users of packet-based mobile devices become connected to the wireless network. In exemplary fashion, the packet traffic originating from user devices is transported via an over-the-air interface to a BTS 508, and from the BTS 508 to the BSC 502. Base station subsystems, such as BSS 500, are a part of internal frame relay network 510 that can include Service GPRS Support Nodes ("SGSN") such as SGSN 512 and 514. Each SGSN is connected to an internal packet network 520 through which a SGSN 512, 514, etc. can route data packets to and from a plurality of gateway GPRS support nodes (GGSN) 522, 524, 526, etc. As illustrated, SGSN 514 and GGSNs 522, 524, and 526 are part of internal packet network 520. Gateway GPRS serving nodes 522, 524 and 526 mainly provide an interface to external Internet Protocol ("IP") networks such as Public Land Mobile Network ("PLMN") 550, corporate intranets 540, or Fixed-End System ("FES") or the public Internet 530. As illustrated, subscriber corporate network 540 may be connected to GGSN 524 via firewall 532; and PLMN 550 is connected to GGSN 524 via boarder gateway router 534. The Remote Authentication Dial-In User Service ("RADIUS") server 542 may be used for caller authentication when a user of a mobile cellular device calls corporate network 540.

Generally, there may be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 6:
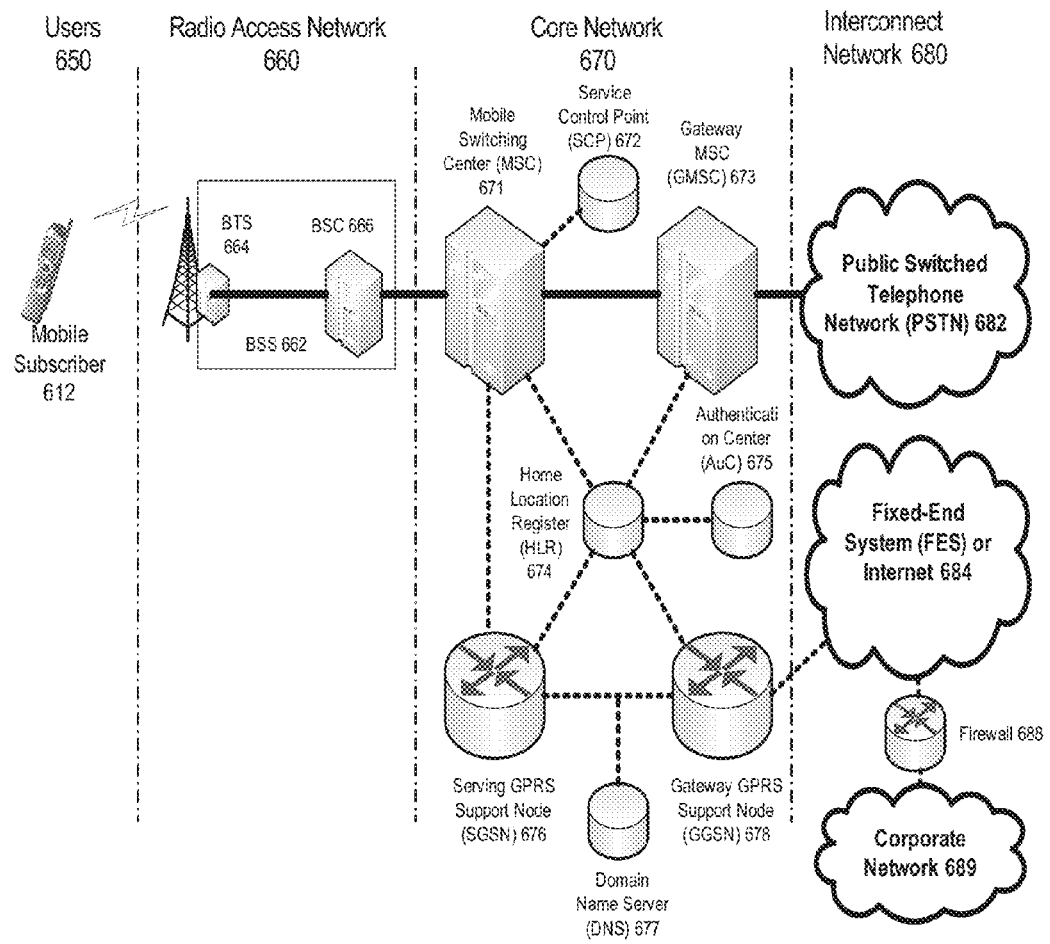
FIG. 6 illustrates an architecture of a typical GPRS network in which the CMAS may be utilized to trigger alternative receivers.
Figure 7:
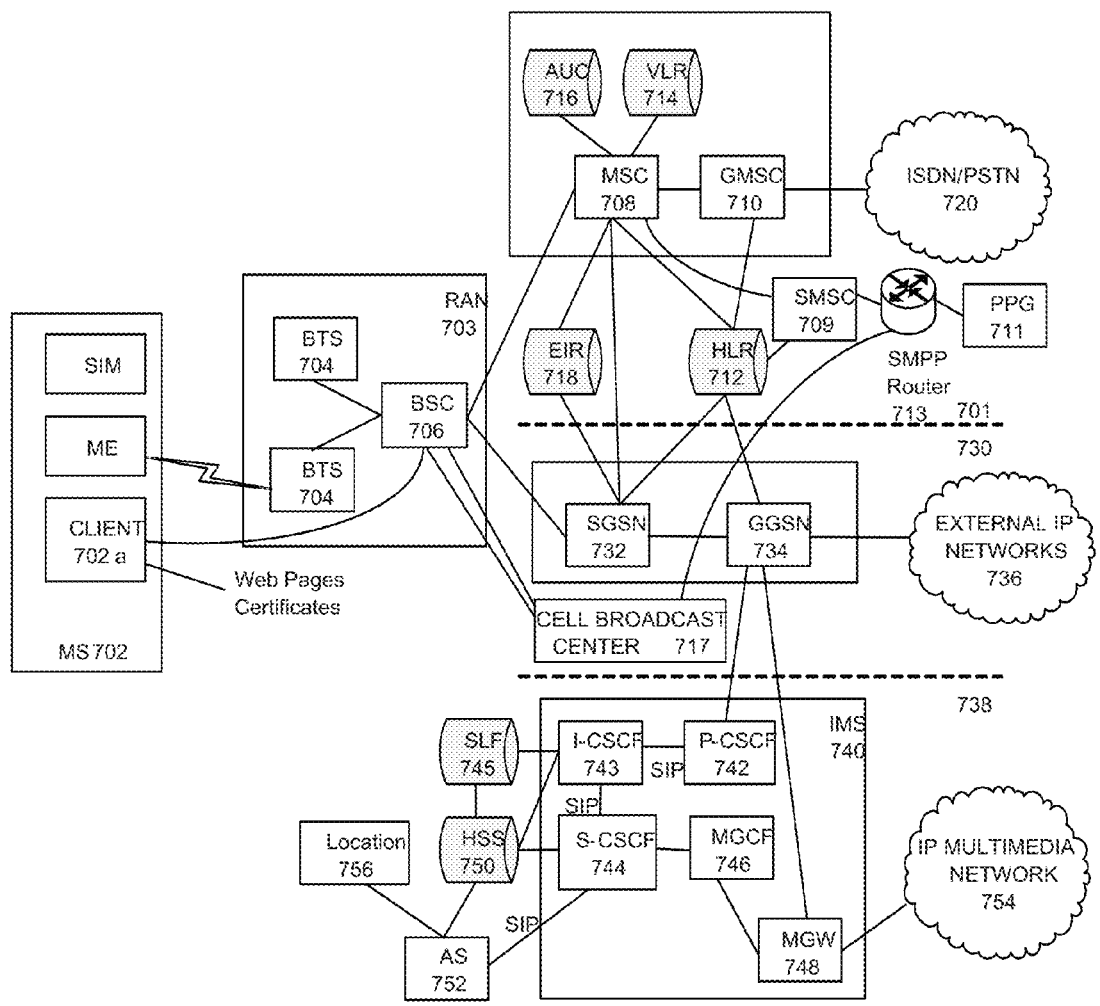
FIG. 7 illustrates an exemplary block diagram view of a GSM/GPRS/IP multimedia network architecture within which the CMAS may be utilized to trigger alternative receivers.

FIG. 6 illustrates an architecture of a typical GPRS network in which the CMAS may be utilized to trigger alternative receivers. The architecture depicted in FIG. 7 is segmented into four groups: users 750, radio access network 760, core network 770, and interconnect network 780. Users 750 comprise a plurality of end users. Note, device 712 is referred to as a mobile subscriber in the description of network shown in FIG. 7. In an example embodiment, the device depicted as mobile subscriber 712 comprises a communications device (e.g., a cellular telephone). Radio access network 660 comprises a plurality of base station subsystems such as BSSs 662, which include BTSs 664 and BSCs 666. Core network 670 comprises a host of various network elements. As illustrated in FIG. 6, core network 670 may comprise Mobile Switching Center ("MSC") 671, Service Control Point ("SCP") 672, gateway MSC 673, SGSN 676, Home Location Register ("HLR") 674, Authentication Center ("AuC") 675, Domain Name Server ("DNS") 677, and GGSN 678. Interconnect network 680 also comprises a host of various networks and other network elements. As illustrated in FIG. 6, interconnect network 680 comprises Public Switched Telephone Network ("PSTN") 682, Fixed-End System ("FES") or Internet 684, firewall 688, and Corporate Network 689.

A mobile switching center may be connected to a large number of base station controllers. At MSC 671, for instance, depending on the type of traffic, the traffic may be separated in that voice may be sent to Public Switched Telephone Network ("PSTN") 682 through Gateway MSC ("GMSC") 673, and/or data may be sent to SGSN 676, which then sends the data traffic to GGSN 678 for further forwarding.

When MSC 671 receives call traffic, for example, from BSC 666, it sends a query to a database hosted by SCP 672. The SCP 672 processes the request and issues a response to MSC 671 so that it may continue call processing as appropriate.

The HLR 674 is a centralized database for users to register to the GPRS network. HLR 674 stores static information about the subscribers such as the International Mobile Subscriber Identity ("IMSI"), subscribed services, and a key for authenticating the subscriber. HLR 674 also stores dynamic subscriber information such as the current location of the mobile subscriber. Associated with HLR 674 is AuC 675. AuC 675 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 6, when mobile subscriber 612 initiates the attach process by turning on the network capabilities of the mobile device, an attach request is sent by mobile subscriber 612 to SGSN 676. The SGSN 676 queries another SGSN, to which mobile subscriber 612 was attached before, for the identity of mobile subscriber 612. Upon receiving the identity of mobile subscriber 612 from the other SGSN, SGSN 676 requests more information from mobile subscriber 612. This information is used to authenticate mobile subscriber 612 to SGSN 676 by HLR 674. Once verified, SGSN 676 sends a location update to HLR 674 indicating the change of location to a new SGSN, in this case SGSN 676. HLR 674 notifies the old SGSN, to which mobile subscriber 612 was attached before, to cancel the location process for mobile subscriber 612. HLR 674 then notifies SGSN 676 that the location update has been performed. At this time, SGSN 676 sends an Attach Accept message to mobile subscriber 612, which in turn sends an Attach Complete message to SGSN 676.

After attaching itself with the network, mobile subscriber 612 then goes through the authentication process. In the authentication process, SGSN 676 sends the authentication information to HLR 674, which sends information back to SGSN 676 based on the user profile that was part of the user's initial setup. The SGSN 676 then sends a request for authentication and ciphering to mobile subscriber 612. The mobile subscriber 612 uses an algorithm to send the user identification (ID) and password to SGSN 676. The SGSN 676 uses the same algorithm and compares the result. If a match occurs, SGSN 676 authenticates mobile subscriber 612.

Next, the mobile subscriber 612 establishes a user session with the destination network, corporate network 689, by going through a Packet Data Protocol ("PDP") activation process. Briefly, in the process, mobile subscriber 612 requests access to the Access Point Name ("APN"), for example, UPS.com, and SGSN 676 receives the activation request from mobile subscriber 612. SGSN 676 then initiates a Domain Name Service ("DNS") query to learn which GGSN node has access to the UPS.com APN. The DNS query is sent to the DNS server within the core network 670, such as DNS 677, which is provisioned to map to one or more GGSN nodes in the core network 670. Based on the APN, the mapped GGSN 678 can access the requested corporate network 689. The SGSN 676 then sends to GGSN 678 a Create Packet Data Protocol ("PDP") Context Request message that contains necessary information. The GGSN 678 sends a Create PDP Context Response message to SGSN 676, which then sends an Activate PDP Context Accept message to mobile subscriber 612.

Once activated, data packets of the call made by mobile subscriber 612 can then go through radio access network 660, core network 670, and interconnect network 680, in a particular fixed-end system or Internet 684 and firewall 688, to reach corporate network 789.

FIG. 7 illustrates an exemplary block diagram view of a GSM/GPRS/IP multimedia network architecture within which the CMAS may be utilized to trigger alternative receivers. As illustrated, the architecture of FIG. 7 includes a GSM core network 701, a GPRS network 730 and an IP multimedia network 738. The GSM core network 701 includes a Mobile Station (MS) 702, at least one Base Transceiver Station (BTS) 704 and a Base Station Controller (BSC) 706. The MS 702 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 704 is physical equipment, such as a radio tower, that enables a radio interface to communicate with the MS. Each BTS may serve more than one MS. The BSC 706 manages radio resources, including the BTS. The BSC may be connected to several BTSs. The BSC and BTS components, in combination, are generally referred to as a base station (BSS) or radio access network (RAN) 703.

The GSM core network 701 also includes a Mobile Switching Center (MSC) 708, a Gateway Mobile Switching Center (GMSC) 710, a Home Location Register (HLR) 712, Visitor Location Register (VLR) 714, an Authentication Center (AuC) 718, and an Equipment Identity Register (EIR) 716. The MSC 708 performs a switching function for the network. The MSC also performs other functions, such as registration, authentication, location updating, handovers, and call routing. The GMSC 710 provides a gateway between the GSM network and other networks, such as an Integrated Services Digital Network (ISDN) or Public Switched Telephone Networks (PSTNs) 720. Thus, the GMSC 710 provides interworking functionality with external networks.

The HLR 712 is a database that contains administrative information regarding each subscriber registered in a corresponding GSM network. The HLR 712 also contains the current location of each MS. The VLR 714 is a database that contains selected administrative information from the HLR 712. The VLR contains information necessary for call control and provision of subscribed services for each MS currently located in a geographical area controlled by the VLR. The HLR 712 and the VLR 714, together with the MSC 708, provide the call routing and roaming capabilities of GSM. The AuC 716 provides the parameters needed for authentication and encryption functions. Such parameters allow verification of a subscriber's identity. The EIR 718 stores security-sensitive information about the mobile equipment.

A Short Message Service Center (SMSC) 709 allows one-to-one Short Message Service (SMS) messages to be sent to/from the MS 702. A Push Proxy Gateway (PPG) 711 is used to "push" (i.e., send without a synchronous request) content to the MS 702. The PPG 711 acts as a proxy between wired and wireless networks to facilitate pushing of data to the MS 702. A Short Message Peer to Peer (SMPP) protocol router 713 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 702 sends a location update including its current location information to the MSC/VLR, via the BTS 704 and the BSC 706. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 730 is logically implemented on the GSM core network architecture by introducing two packet-switching network nodes, a serving GPRS support node (SGSN) 732, a cell broadcast and a Gateway GPRS support node (GGSN) 734. The SGSN 732 is at the same hierarchical level as the MSC 708 in the GSM network. The SGSN controls the connection between the GPRS network and the MS 702. The SGSN also keeps track of individual MS's locations and security functions and access controls.

A Cell Broadcast Center (CBC) 717 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 734 provides a gateway between the GPRS network and a public packet network (PDN) or other IP networks 736. That is, the GGSN provides interworking functionality with external networks, and sets up a logical link to the MS through the SGSN. When packet-switched data leaves the GPRS network, it is transferred to an external TCP-IP network 736, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 730 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 738 was introduced with 3GPP Release 8, and includes an IP multimedia subsystem (IMS) 740 to provide rich multimedia services to end users. A representative set of the network entities within the IMS 740 are a call/session control function (CSCF), a media gateway control function (MGCF) 746, a media gateway (MGW) 748, and a master subscriber database, called a home subscriber server (HSS) 750. The HSS 750 may be common to the GSM network 701, the GPRS network 730 as well as the IP multimedia network 738.

The IP multimedia system 740 is built around the call/session control function, of which there are three types: an interrogating CSCF (I-CSCF) 743, a proxy CSCF (P-CSCF) 742, and a serving CSCF (S-CSCF) 744. The P-CSCF 742 is the MS's first point of contact with the IMS 740. The P-CSCF 742 forwards session initiation protocol (SIP) messages received from the MS to an SIP server in a home network (and vice versa) of the MS. The P-CSCF 742 may also modify an outgoing request according to a set of rules defined by the network operator (for example, address analysis and potential modification).

The I-CSCF 743, forms an entrance to a home network and hides the inner topology of the home network from other networks and provides flexibility for selecting an S-CSCF. The I-CSCF 743 may contact a subscriber location function (SLF) 745 to determine which HSS 750 to use for the particular subscriber, if multiple HSS's 750 are present. The S-CSCF 744 performs the session control services for the MS 702. This includes routing originating sessions to external networks and routing terminating sessions to visited networks. The S-CSCF 744 also decides whether an application server (AS) 752 is required to receive information on an incoming SIP session request to ensure appropriate service handling. This decision is based on information received from the HSS 750 (or other sources, such as an application server 752). The AS 752 also communicates to a location server 756 (e.g., a Gateway Mobile Location Center (GMLC)) that provides a position (e.g., latitude/longitude coordinates) of the MS 702.

The HSS 750 contains a subscriber profile and keeps track of which core network node is currently handling the subscriber. It also supports subscriber authentication and authorization functions (AAA). In networks with more than one HSS 750, a subscriber location function provides information on the HSS 750 that contains the profile of a given subscriber.

The MGCF 746 provides interworking functionality between SIP session control signaling from the IMS 740 and ISUP/BICC call control signaling from the external GSTN networks (not shown). It also controls the media gateway (MGW) 748 that provides user-plane interworking functionality (e.g., converting between AMR- and PCM-coded voice). The MGW 748 also communicates with other IP multimedia networks 754.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 8:
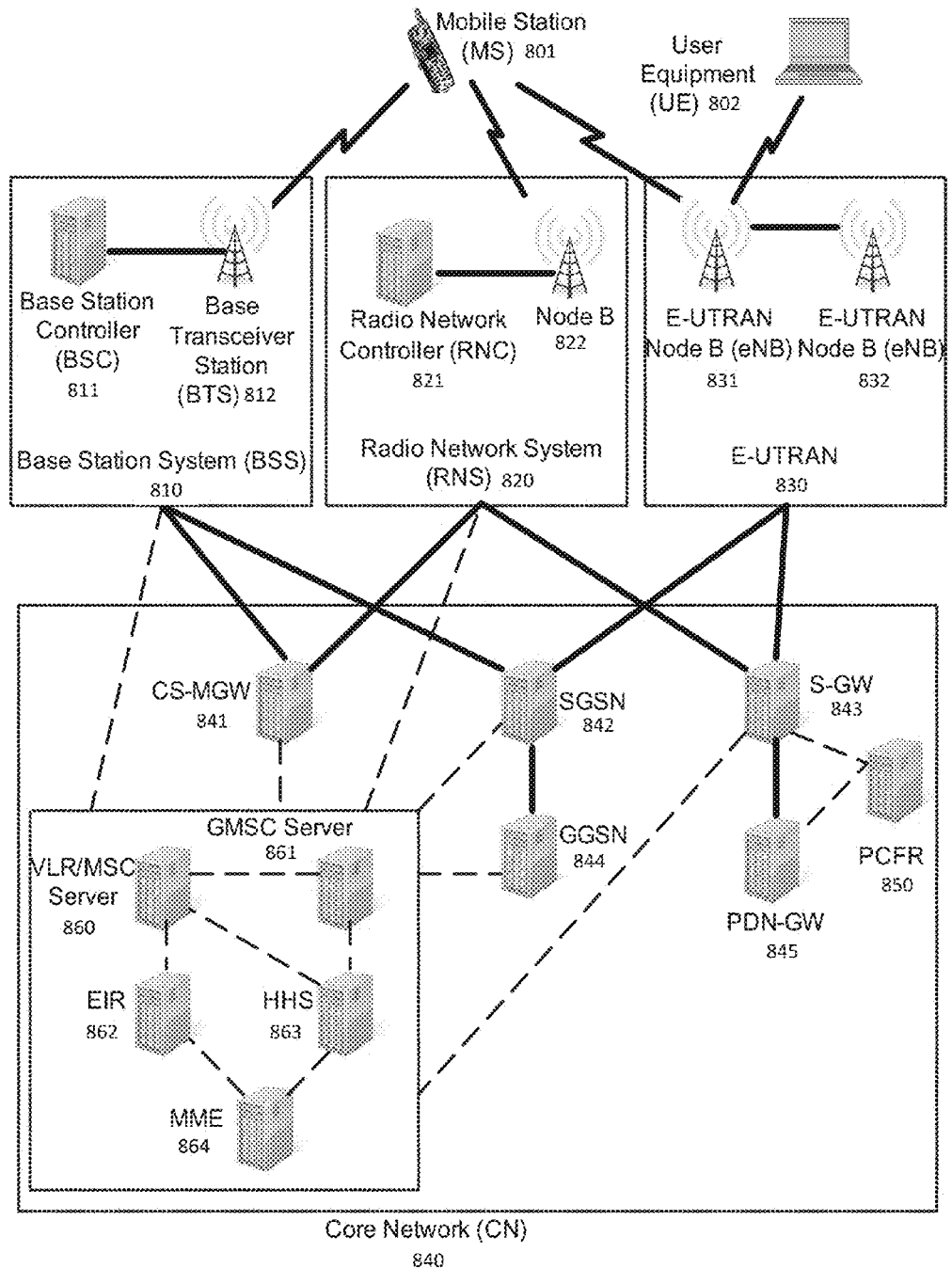
FIG. 8 illustrates a PLMN block diagram view of an exemplary architecture in which the CMAS may be utilized to trigger alternative receivers.

FIG. 8 illustrates a PLMN block diagram view of an exemplary architecture in which the CMAS may be utilized to trigger alternative receivers. Mobile Station (MS) 801 is the physical equipment used by the PLMN subscriber. In one illustrative embodiment, a communications device such as a cellular telephone may serve as Mobile Station 801. Mobile Station 801 may be one of, but not limited to, a cellular telephone, a cellular telephone in combination with another electronic device or any other wireless mobile communication device.

Mobile Station 801 may communicate wirelessly with Base Station System (BSS) 810. BSS 810 contains a Base Station Controller (BSC) 811 and a Base Transceiver Station (BTS) 812. BSS 810 may include a single BSC 811/BTS 812 pair (Base Station) or a system of BSC/BTS pairs which are part of a larger network. BSS 810 is responsible for communicating with Mobile Station 801 and may support one or more cells. BSS 810 is responsible for handling cellular traffic and signaling between Mobile Station 801 and Core Network 840. Typically, BSS 810 performs functions that include, but are not limited to, digital conversion of speech channels, allocation of channels to mobile devices, paging, and transmission/reception of cellular signals.

Additionally, Mobile Station 801 may communicate wirelessly with Radio Network System (RNS) 820. RNS 820 contains a Radio Network Controller (RNC) 821 and one or more Node(s) B 822. RNS 820 may support one or more cells. RNS 820 may also include one or more RNC 821/ Node B 822 pairs or alternatively a single RNC 821 may manage multiple Nodes B 822. RNS 820 is responsible for communicating with Mobile Station 801 in its geographically defined area. RNC 821 is responsible for controlling the Node(s) B 822 that are connected to it and is a control element in a UMTS radio access network. RNC 821 performs functions such as, but not limited to, load control, packet scheduling, handover control, security functions, as well as controlling Mobile Station 801's access to the Core Network (CN) 840.

The evolved UMTS Terrestrial Radio Access Network (E-UTRAN) 830 is a radio access network that provides wireless data communications for Mobile Station 801 and User Equipment 802. E-UTRAN 830 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 830 may include of series of logical network components such as E-UTRAN Node B (eNB) 831 and E-UTRAN Node B (eNB) 832. E-UTRAN 830 may contain one or more eNBs. User Equipment 802 may be any user device capable of connecting to E-UTRAN 830 including, but not limited to, a personal computer, laptop, mobile device, wireless router, or other device capable of wireless connectivity to E-UTRAN 830. The improved performance of the E-UTRAN 830 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 8 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 801 may communicate with any or all of BSS 810, RNS 820, or E-UTRAN 830. In a illustrative system, each of BSS 810, RNS 820, and E-UTRAN 830 may provide Mobile Station 801 with access to Core Network 840. The Core Network 840 may include of a series of devices that route data and communications between end users. Core Network 840 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 841 is part of Core Network 840, and interacts with Visitor Location Register (VLR) and Mobile-Services Switching Center (MSC) Server 860 and Gateway MSC Server 861 in order to facilitate Core Network 840 resource control in the CS domain. Functions of CS-MGW 841 include, but are not limited to, media conversion, bearer control, payload processing and other mobile network processing such as handover or anchoring. CS-MGW 840 may receive connections to Mobile Station 801 through BSS 810, RNS 820 or both.

Serving GPRS Support Node (SGSN) 842 stores subscriber data regarding Mobile Station 801 in order to facilitate network functionality. SGSN 842 may store subscription information such as, but not limited to, the International Mobile Subscriber Identity (IMSI), temporary identities, or Packet Data Protocol (PDP) addresses. SGSN 842 may also store location information such as, but not limited to, the Gateway GPRS Support Node (GGSN) 844 address for each GGSN where an active PDP exists. GGSN 844 may implement a location register function to store subscriber data it receives from SGSN 842 such as subscription or location information.

Serving Gateway (S-GW) 843 is an interface which provides connectivity between E-UTRAN 830 and Core Network 840. Functions of S-GW 843 include, but are not limited to, packet routing, packet forwarding, transport level packet processing, event reporting to Policy and Charging Rules Function (PCRF) 850, and mobility anchoring for inter-network mobility. PCRF 850 uses information gathered from S-GW 843, as well as other sources, to make applicable policy and charging decisions related to data flows, network resources and other network administration functions. Packet Data Network Gateway (PDN-GW) 845 may provide user-to-services connectivity functionality including, but not limited to, network-wide mobility anchoring, bearer session anchoring and control, and IP address allocation for PS domain connections.

Home Subscriber Server (HSS) 863 is a database for user information, and stores subscription data regarding Mobile Station 801 or User Equipment 802 for handling calls or data sessions. Networks may contain one HSS 863 or more if additional resources are required. Exemplary data stored by HSS 863 include, but is not limited to, user identification, numbering and addressing information, security information, or location information. HSS 863 may also provide call or session establishment procedures in both the PS and CS domains.

The VLR/MSC Server 860 provides user location functionality. When Mobile Station 801 enters a new network location, it begins a registration procedure. A MSC Server for that location transfers the location information to the VLR for the area. A VLR and MSC Server may be located in the same computing environment, as is shown by VLR/MSC Server 860, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 801 registration or procedures for handover of Mobile Station 801 to a different section of the Core Network 840. GMSC Server 861 may serve as a connection to alternate GMSC Servers for other mobile stations in larger networks.

Equipment Identity Register (EIR) 862 is a logical element which may store the International Mobile Equipment Identities (IMEI) for Mobile Station 801. In a typical embodiment, user equipment may be classified as either "white listed" or "black listed" depending on its status in the network. In one embodiment, if Mobile Station 801 is stolen and put to use by an unauthorized user, it may be registered as "black listed" in EIR 862, preventing its use on the network. Mobility Management Entity (MME) 864 is a control node which may track Mobile Station 801 or User Equipment 802 if the devices are idle. Additional functionality may include the ability of MME 864 to contact an idle Mobile Station 801 or User Equipment 802 if retransmission of a previous session is required.

It will be understood that the terms and expressions used herein have the ordinary meaning as is accorded to such terms and expressions by persons of ordinary skill in the field of the present disclosure as set forth above except where specific meanings have otherwise been set forth herein.

The sequences and methods shown and described herein can be carried out in a different order than those described. The particular sequences, functions, and operations depicted in the drawings are merely illustrative of one or more embodiments of the present disclosure, and other implementations will be apparent to those of ordinary skill in the art. The drawings are intended to illustrate various implementations of the present disclosure that can be understood and appropriately carried out by those of ordinary skill in the art. Any arrangement, which is calculated to achieve the same purpose, may be substituted for the specific embodiments shown.

Although the present disclosure has been described in connection with some embodiments, it is not intended to be limited to the specific form set forth herein. Rather, the scope of the present disclosure is limited only by the accompanying claims. Additionally, although a feature may appear to be described in connection with particular embodiments, one of ordinary skill in the art would recognize that various features of the described embodiments may be combined in accordance with the present disclosure. In the claims, the term "comprising" does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a," "an," "first," "second," etc. do not preclude a plurality.

While example embodiments of utilizing the CMAS to trigger alternative receivers has been described in connection with various computing devices/processors, the underlying concepts can be applied to any computing device, processor, and/or system capable of facilitating initiation of a call to an emergency call center as described herein. The methods and apparatuses for initiating a call to an emergency call center, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for facilitating initiation of a call to an emergency call center. A computer-readable storage medium, as described herein is an article of manufacture, and thus, not to be construed as a transient signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for utilizing the CMAS to trigger alternative receivers may be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for facilitating initiation of a call to an emergency call center. When implemented on a general-purpose processor, the program code combines with the processor to provide a unique apparatus that operates to invoke the functionality for utilizing the CMAS to trigger alternative receivers.

While utilizing the CMAS to trigger alternative receivers has been described in connection with the various embodiments of the various figures, it is to be understood that other similar embodiments can be used or modifications and additions can be made to the described embodiments for initiating a call to an emergency call center. For example, one skilled in the art will recognize that utilizing the CMAS to trigger alternative receivers as described in the present application may apply to any environment, whether wired or wireless, and may be applied to any number of devices connected via a communications network and interacting across the network. Therefore, utilizing the CMAS to trigger alternative receivers should not be limited to any single embodiment, but rather should be construed in breadth and scope in accordance with the appended claims.

What is claimed:

1. An apparatus comprising:
a processor; and
memory coupled to the processor, the memory comprising executable instructions that when executed by the processor cause the processor to effectuate operations comprising:
obtaining, via a wireless broadcast application, configuration data corresponding to at least one broadcast source for a geographic location responsive to at least one of:
the apparatus being powered on for a first time in the geographic location; or
the apparatus migrating, while powered on, to the geographic location;
determining that the apparatus is capable of receiving signals from the at least one broadcast source; and
tuning to a channel determined by the wireless broadcast application to be associated with the geographic location of the apparatus.

2. The apparatus of claim 1, the operations further comprising:
configuring the apparatus to be in an on state for receiving a wireless broadcast message while an at least one receiver is initially in an off state; and
powering on the apparatus in response to receiving the wireless broadcast message.

3. The apparatus of claim 1, wherein the wireless broadcast application comprises a commercial mobile alert system (CMAS) application.

4. The apparatus of claim 1, the at least one broadcast source comprising at least one of a digital television broadcast, a frequency modulation broadcast, an amplitude modulation broadcast, a satellite broadcast, or a national oceanic and atmospheric administration weather radio broadcast.

5. The apparatus of claim 1, the operations further comprising:
selecting a source of the at least one broadcast source based on a relative signal strength of a respective at least one signal provided by the at least one broadcast source.

6. The apparatus of claim 1, the operations further comprising determining a signal strength associated with each of the at least one broadcast source.

7. The apparatus of claim 1, wherein the apparatus comprises at least one of a digital television receiver, a frequency modulation receiver, an amplitude modulation receiver, a satellite receiver, or a national oceanic and atmospheric administration weather radio receiver.

8. A method comprising:
obtaining, via a wireless broadcast application on an apparatus, configuration data corresponding to at least one broadcast source for a geographic location responsive to at least one of:
the apparatus being powered on for a first time in the geographic location; or
the apparatus migrating, while powered on, to the geographic location;
determining that the apparatus is capable of receiving signals from the at least one broadcast source; and
tuning to a channel determined by the wireless broadcast application to be associated with the geographic location of the apparatus.

9. The method of claim 8, further comprising:
configuring the apparatus to be in an on state for receiving a wireless broadcast message while an at least one receiver is initially in an off state; and
powering on the apparatus in response to receiving the wireless broadcast message.

10. The method of claim 8, wherein the wireless broadcast application comprises a commercial mobile alert system (CMAS) application.

11. The method of claim 8, the at least one broadcast source comprising at least one of a digital television broadcast, a frequency modulation broadcast, an amplitude modulation broadcast, a satellite broadcast, or a national oceanic and atmospheric administration weather radio broadcast.

12. The method of claim 8, further comprising:
selecting a source of the at least one broadcast source based on a relative signal strength of a respective at least one signal provided by the at least one broadcast source.

13. The method of claim 8, further comprising determining a signal strength associated with each of the at least one broadcast source.

14. The method of claim 8, wherein the apparatus comprises at least one of a digital television receiver, a frequency modulation receiver, an amplitude modulation receiver, a satellite receiver, or a national oceanic and atmospheric administration weather radio receiver.

15. A computer-readable storage medium comprising executable instructions that when executed by a processor cause the processor to effectuate operations comprising:
obtaining, via a wireless broadcast application on an apparatus, configuration data corresponding to at least one broadcast source for a geographic location responsive to at least one of:
the apparatus being powered on for a first time in the geographic location; or
the apparatus migrating, while powered on, to the geographic location;
determining that the apparatus is capable of receiving signals from the at least one broadcast source; and
tuning to a channel determined by the wireless broadcast application to be associated with the geographic location of the apparatus.

16. The computer-readable storage medium of claim 15, the operations further comprising:
configuring the apparatus to be in an on state for receiving a wireless broadcast message while an at least one receiver is initially in an off state; and
powering on the apparatus in response to receiving the wireless broadcast message.

17. The computer-readable storage medium of claim 15, the operations further comprising:
   selecting a source of the at least one broadcast source based on a relative signal strength of a respective at least one signal provided by the at least one broadcast source.

18. The computer-readable storage medium of claim 15, the operations further comprising determining a signal strength associated with each of the at least one broadcast source.

19. The computer-readable storage medium of claim 15, the wireless broadcast application comprises a commercial mobile alert system (CMAS) application.

20. The computer-readable storage medium of claim 15, the at least one broadcast source comprising at least one of a digital television broadcast, a frequency modulation broadcast, an amplitude modulation broadcast, a satellite broadcast, or a national oceanic and atmospheric administration weather radio broadcast.

* * * * *